US012725301B2

(12) United States Patent
Balasubramanian et al.

(10) Patent No.: US 12,725,301 B2
(45) Date of Patent: Sep. 1, 2026

(54) SEMANTIC VISUAL FEATURE SHARING

(71) Applicant: QUALCOMM Incorporated, San Diego, CA (US)

(72) Inventors: Anantharaman Balasubramanian, San Diego, CA (US); Stelios Stefanatos, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 356 days.

(21) Appl. No.: 18/467,526

(22) Filed: Sep. 14, 2023

(65) Prior Publication Data

US 2025/0095200 A1 Mar. 20, 2025

(51) Int. Cl.
*G06T 7/73* (2017.01)
*G06V 10/75* (2022.01)
*G06V 20/58* (2022.01)
*G06V 20/70* (2022.01)

(52) U.S. Cl.
CPC .............. *G06T 7/74* (2017.01); *G06V 10/751* (2022.01); *G06V 20/58* (2022.01); *G06V 20/70* (2022.01); *G06T 2207/10016* (2013.01); *G06T 2207/30241* (2013.01); *G06T 2207/30252* (2013.01)

(58) Field of Classification Search
None
See application file for complete search history.

(56) References Cited

U.S. PATENT DOCUMENTS 9,031,326 B2 * 5/2015 Yu .......................... G06V 20/00 382/165
11,761,780 B1 * 9/2023 Duenas Arana ..... G01C 21/387 701/533
12,014,549 B2 * 6/2024 Pan .......................... G06T 3/18
2011/0299770 A1 * 12/2011 Vaddadi ............... G06V 10/757 382/165
2017/0124476 A1 * 5/2017 Levinson .............. B60L 3/0007
2017/0316333 A1 * 11/2017 Levinson .............. B60W 40/04
2019/0225210 A1 * 7/2019 Herman ................. G08G 1/161
2020/0334486 A1 * 10/2020 Joseph .................. G06V 20/00
2021/0241022 A1 * 8/2021 Lee ........................ G06N 3/045
2021/0295478 A1 * 9/2021 Liao ....................... G06V 20/64
2022/0284598 A1 * 9/2022 Bhargava ............... G06V 20/48
2022/0287530 A1 * 9/2022 Xi .......................... G06V 20/64

OTHER PUBLICATIONS

Keskar, M., Greer, R., Gopalkrishnan, A., Deo, N., & Trivedi, M. (2025). Lights as points: Learning to look at vehicle substructures with anchor-free object detection. IEEE Robotics and Automation Letters. (Year: 2025).*

(Continued)

*Primary Examiner* — Michelle M Entezari Hausmann
(74) *Attorney, Agent, or Firm* — Shumaker & Sieffert, P.A.

(57) ABSTRACT

An example device for processing image data includes a processing unit configured to determine a set of criteria representing keypoints of interest for processed image data; extract a plurality of keypoints from the image; determine which of the plurality of keypoints match the set of criteria representing the keypoints of interest to determine a matched set of keypoints; and output data representative of the matched set of keypoints.

22 Claims, 11 Drawing Sheets

(56) References Cited

OTHER PUBLICATIONS

Yi, Sheng, Hao Zhang, and Kai Liu. “V2iviewer: Towards efficient collaborative perception via point cloud data fusion and vehicle-to-infrastructure communications.” IEEE Transactions on Network Science and Engineering 11.6 (2024): 6219-6230. (Year: 2024).*

Zhang, Y., Li, J., Luo, K., Yang, Y., Han, J., Liu, N., Qin, D., Han, P. and Xu, C., 2024. V2VSSC: A 3D semantic scene completion benchmark for perception with vehicle to vehicle communication. arXiv preprint arXiv:2402.04671. (Year: 2024).*

Sharma, Sarthak. Leveraging Object Shape and Scene Geometry for Online Multi Object Tracking using Monocular Camera. Diss. International Institute of Information Technology Hyderabad, 2019. (Year: 2019).*

López, Javier García, Antonio Agudo, and Francesc Moreno-Noguer. “Vehicle pose estimation via regression of semantic points of interest.” 2019 11th International Symposium on Image and Signal Processing and Analysis (ISPA). IEEE, 2019. (Year: 2019).*

Bao Y., et al., “Semantic-Direct Visual Odometry”, IEEE Robotics and Automation Letters, vol. 7, No. 3, Jul. 1, 2022, pp. 6718-6725, XP093222698, ISSN: 2377-3774, DOI: 10.1109/LRA.2022.3176799, The Whole Document.

Harris C., et al., “A Combined Corner and Edge Detector”, Proceedings of the Alvey Vision Conference 1988, Jan. 1, 1988, pp. 23.1-23.6, XP055545717, pp. 147-151, DOI: 10.5244/C.2.23, Abstract Section “Auto-Correlation Detector” and “Corner/Edge Response Function”, Figure 7.

International Search Report and Written Opinion—PCT/US2024/045943—ISA/EPO—Nov. 29, 2024 (12 pp).

Lianos K.N., et al., “VSO: Visual Semantic Odometry”, Oct. 6, 2018, SAT 2015 18th International Conference, Austin, TX, USA, Sep. 24-27, 2015, [Lecture Notes in Computer Science, Lect.Notes Computer], Springer, Berlin, Heidelberg, pp. 246-263, XP047489245, 18 Pages, ISBN: 978-3-540-74549-5 [Retrieved on Oct. 6, 2018] Abstract, Figure 1, Sec. 3.1.

* cited by examiner

| | Key Point (x,y) 301 | Descriptor 303 | Semantic Meaning 305 |
|---|---|---|---|
| First Key Point | $[x_1, y_1]$ | SURF/ORB/SIFT descriptor for $[x_1, y_1]$ | Left taillight of a car |
| Set of Second Key Points | $[x_{21}, y_{21}]$, …., $[x_{26}, y_{26}]$, | HARRIS/ORB/SIFT descriptor for Set 2 | Corner points of a STOP sign |
| Third Key Point | $[x_3, y_3]$ | HARRIS/ORB/SIFT descriptor for $[x_3, y_3]$ | Window pane corners of a building |

FIG. 3

| Semantic Identifier 304 | Semantic Meaning 585 |
|---|---|
| 0 | Left tail car lights, truck lights in front of the ego vehicle |
| 1 | Left tail car lights, truck lights on the side of the ego vehicle |
| 2 | Corner Points of Stop Sign |
| 3 | Corner Points of foliage |

FIG. 4

| First level Hierarchy Identifier 501 | Second level Hierarchy Identifier 502 | Semantic Feature 505 |
|---|---|---|
| $H_1 - 1$ (car) | $H_2 - 1$ (left taillight) | Cars with left taillight as key points and their associated descriptors |
| | $H_2 - 2$ (side view mirror) | Cars with side view mirror corner as key points and their associated descriptors |
| $H_1 - 2$ (truck) | $H_2 - 1$(left taillight) | Trucks with left taillight as key points and their associated descriptors |
| | $H_2 - 2$ (side view mirror) | Trucks with side view mirror corner as key points and their associated descriptors |

FIG. 6

| First level Hierarchy Identifier 501 | Second level Hierarchy Identifier 1502 | Third level Hierarchy Identifier 503 | Semantic Feature 505 |
|---|---|---|---|
| $H_1 - 1$ (car) | $H_2 - 1$ (car with license plate # : X) | $H_3 - 1$ (left taillight) | Car with license plate #:X, with left taillight as key points and their associated descriptors |
| | $H_2 - 2$ (cars that are green in color) | $H_3 - 2$ (side view mirror) | Cars that are green in color with side view mirror corner as key points and their associated descriptors |

FIG. 7

SEMANTIC VISUAL FEATURE SHARING

TECHNICAL FIELD

This disclosure relates to artificial intelligence, particularly as applied to autonomous driving systems.

BACKGROUND

Techniques are being researched and developed related to autonomous driving and advanced driving assistance systems. For example, artificial intelligence and machine learning (AI/ML) systems are being developed and trained to determine how best to operate a vehicle according to applicable traffic laws, safety guidelines, external objects, roads, and the like. Using cameras to collect images, depth estimation is performed to determine depths of objects in the images. Depth estimation can be performed by leveraging various principles, such as calibrated stereo imaging systems and multi-view imaging systems.

Various techniques have been used to perform depth estimation. For example, test-time refinement techniques include applying an entire training pipeline to test frames to update network parameters, which necessitates costly multiple forward and backward passes. Temporal convolutional neural networks rely on stacking of input frames in the channel dimension and bank on the ability of convolutional neural networks to effectively process input channels. Recurrent neural networks may process multiple frames during training, which is computationally demanding due to the need to extract features from multiple frames in a sequence and does not reason about geometry during inference. Techniques using an end-to-end cost volume to aggregate information during training are more efficient than test-time refinement and recurrent approaches, but are still non-trivial and difficult to map to hardware implementations.

SUMMARY

In general, this disclosure describes techniques for performing image processing by sharing visual features with a target vehicle. In one example, a method of processing image data comprises determining, by processing circuitry of an image analysis unit, a set of criteria representing keypoints of interest for processed image data; extracting, by the processing circuitry, a plurality of keypoints from the image; determining, by the processing circuitry, which of the plurality of keypoints match the set of criteria representing the keypoints of interest to determine a matching set of keypoints; and outputting, by the processing circuitry, data representative of the matching set of keypoints.

In a further example disclosed herein, a first set of image data is gathered from a camera of an ego vehicle. A second set of image data is gathered from a camera of the target vehicle. The first set of image data is associated with a first set of keypoints, and the second set of image data is associated with a second set of keypoints. Each keypoint in the first set of keypoints is associated with a corresponding semantic keypoint descriptor to provide a first set of semantic keypoint descriptors. In a further example, each keypoint in the second set of keypoints may be associated with a corresponding semantic keypoint descriptor to provide a second set of semantic keypoint descriptors. The first set of semantic keypoint descriptors is compared with the second set of semantic keypoint descriptors to identify one or more keypoints of the first set of keypoints that corresponds to one or more keypoints of the second set of keypoints. The identified corresponding keypoints are used to provide pose estimation. The pose estimation is used to determine positions of perceived objects. The target vehicle is operated according to the determined positions of the perceived objects.

In a further example disclosed herein, image data is processed to determine relative pose by comparing a first set of image data gathered by a camera of an ego vehicle with a second set of image data gathered by a camera of a target vehicle. A first autonomous driving unit, operatively coupled to the camera of the ego vehicle, associates the first set of image data with a first set of keypoints, and each keypoint in the first set of keypoints is associated with a corresponding semantic keypoint descriptor to provide a first set of semantic keypoint descriptors. A second autonomous driving unit, operatively coupled to the camera of the target vehicle, associates the second set of image data with a second set of keypoints, and each keypoint in the second set of keypoints is associated with a corresponding semantic keypoint descriptor to provide a second set of semantic keypoint descriptors. The first set of semantic keypoint descriptors is received by the second autonomous driving unit. The second autonomous driving unit compares the first set of semantic keypoint descriptors against the second set of semantic keypoint descriptors to identify one or more keypoints of the first set of keypoints that correspond to one or more keypoints of the second set of keypoints.

In one example disclosed herein, a method of processing image data includes determining, by processing circuitry of an image analysis unit, a set of criteria representing keypoints of interest for processed image data; extracting, by the processing circuitry, a plurality of keypoints from the image; determining, by the processing circuitry, which of the plurality of keypoints match the set of criteria representing the keypoints of interest to determine a matching set of keypoints; and outputting, by the processing circuitry, data representative of the matching set of keypoints.

In another example disclosed herein, a device is provided for processing image data, wherein the device includes processing circuitry configured to: determine a set of criteria representing keypoints of interest for processed image data; extract a plurality of keypoints from the image; determine which of the plurality of keypoints match the set of criteria representing the keypoints of interest to determine a matched set of keypoints; and output data representative of the matched set of keypoints.

In another example disclosed herein, a computer-readable storage medium is provided that includes instructions stored thereon that, when executed, cause a processor to: determine a set of criteria representing keypoints of interest for processed image data; extract a plurality of keypoints from the image; determine which of the plurality of keypoints match the set of criteria representing the keypoints of interest to determine a matched set of keypoints; and output data representative of the matched set of keypoints.

The details of one or more examples are set forth in the accompanying drawings and the description below. Other features, objects, and advantages will be apparent from the description, drawings, and claims.

BRIEF DESCRIPTION OF DRAWINGS

FIG. 3 is a table showing example coordinates, descriptors, and semantic meanings for a plurality of shared keypoints, according to the techniques of this disclosure.

FIG. 4 is a table showing illustrative preconfigured relationships between semantic identifiers and semantic meanings, according to the techniques of this disclosure.

FIG. 6 is a table showing a first example of a hierarchical arrangement of semantic identifiers, according to the techniques of this disclosure.

FIG. 7 is a table showing another example of a hierarchical arrangement of semantic identifiers, according to the techniques of this disclosure.

DETAILED DESCRIPTION

Figure 1:
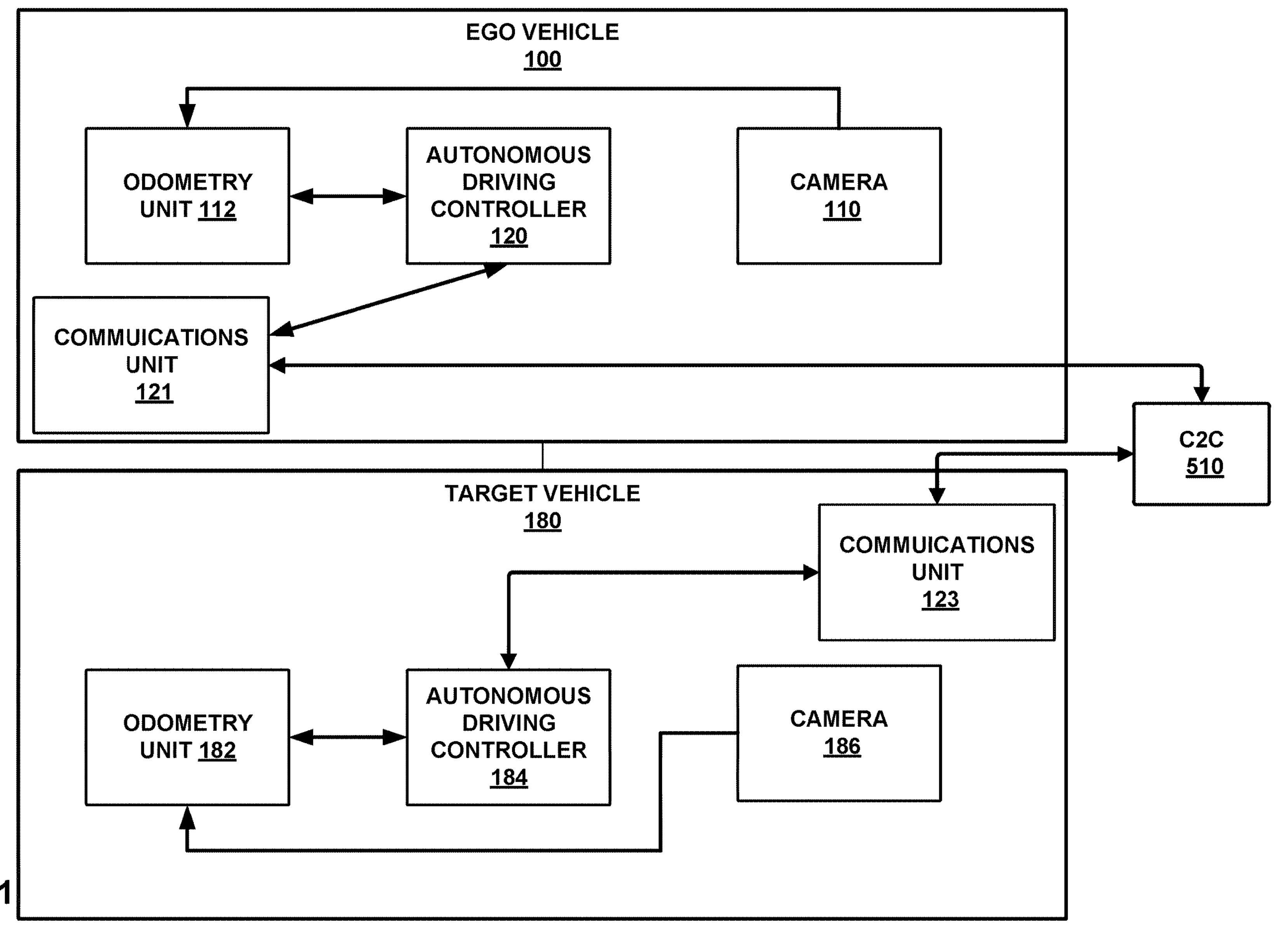
FIG. 1 is a block diagram illustrating an example system wherein an ego vehicle shares semantic aspects of keypoints with a target vehicle, according to techniques of this disclosure.

This disclosure describes techniques for performing image processing by sharing visual features with a target vehicle. A first set of image data is gathered from a camera of an ego vehicle. A second set of image data is gathered from a camera of the target vehicle. The first set of image data is associated with a first set of keypoints, and the second set of image data is associated with a second set of keypoints. Each keypoint in the first set of keypoints is associated with a corresponding semantic keypoint descriptor to provide a first set of semantic keypoint descriptors. Each keypoint in the second set of keypoints is associated with a corresponding semantic keypoint descriptor to provide a second set of semantic keypoint descriptors. The first set of semantic keypoint descriptors is compared with the second set of semantic keypoint descriptors to identify one or more keypoints of the first set of keypoints that corresponds to one or more keypoints of the second set of keypoints. The identified corresponding keypoints are used to provide pose estimation. The pose estimation is used to determine positions of perceived objects. The target vehicle is operated according to the determined positions of the perceived objects.

In a further example disclosed herein, image data is processed to determine relative pose by comparing a first set of image data gathered by a camera of an ego vehicle with a second set of image data gathered by a camera of a target vehicle. A first autonomous driving unit, operatively coupled to the camera of the ego vehicle, associates the first set of image data with a first set of keypoints, and each keypoint in the first set of keypoints is associated with a corresponding semantic keypoint descriptor to provide a first set of semantic keypoint descriptors. A second autonomous driving unit, operatively coupled to the camera of the target vehicle, associates the second set of image data with a second set of keypoints, and each keypoint in the second set of keypoints is associated with a corresponding semantic keypoint descriptor to provide a second set of semantic keypoint descriptors. The first set of semantic keypoint descriptors is received by the second autonomous driving unit. The second autonomous driving unit compares the first set of semantic keypoint descriptors against the second set of semantic keypoint descriptors to identify one or more keypoints of the first set of keypoints that correspond to one or more keypoints of the second set of keypoints.

In a further example disclosed herein, visual odometry information for the vehicle may be provided, along with first and second sets of image data, to an artificial intelligence/machine learning (AI/ML) unit, such as a neural network, which may be trained to estimate a relative pose for one or more objects in the first and second sets of image data relative to a position of the ego vehicle or the target vehicle. Such visual odometry data may be tracked over time by analyzing keypoints detected in a series of consecutive images. For example, certain keypoints may correspond to stationary objects, such as buildings, street signs, or the like, while other keypoints may correspond to mobile objects, such as other vehicles. Thus, by comparing the relative locations of the stationary objects and mobile objects in the images over time, the pose of a vehicle (e.g., position and heading) may be determined.

Visual odometry involves comparing consecutive video frames in a video sequence to infer the trajectory of an ego vehicle. The ego vehicle contains at least one sensor, such as a camera, for perceiving the environment around the vehicle. The trajectory of the ego vehicle may be inferred using a camera coordinate system, and/or the trajectory may be translated into real-world coordinates. Such visual odometry compares one or more keypoints detected over one or more consecutive frames to find a correspondence between the one or more keypoints. The correspondence helps in finding a change in pose between the consecutive image frames. In some examples, a two-dimensional displacement of five or more stationary keypoints detected and tracked across two images gathered by the camera is sufficient to recover a three-dimensional displacement of the camera up to a global scale factor.

Keypoints are pixels in a set of consecutive images gathered by the camera that can be tracked from frame to frame, such as corner points. Some conventional methods for finding keypoints include Harris corner points, Features from Accelerated Segment Test (FAST), Scale-Invariant Feature Transform (SIFT), and Oriented FAST and Rotated Brief (ORB). Keypoints with descriptors (such as in SIFT or ORB) can be independently redetected in each frame, followed by a matching/association procedure. Relative camera poses can be inferred using any of several methods, such as forming and factoring an Essential Matrix using groups of 8 keypoints, or Nister's Method using groups of 5 keypoints. If keypoint depth is being tracked, relative camera poses can be inferred from a Perspective-N-Point (PNP) Method using groups of 3 keypoints Consider an illustrative scenario where the ego vehicle shares one or more visual features with the target vehicle. For example, the ego vehicle may be communicatively coupled to the target vehicle over a Cloud-to-Cloud Server (C2C) via one or more over-the-air, radio-frequency (RF) interfaces. Using conventional approaches, several thousands of visual features (keypoints, descriptors) would need to be shared between the ego vehicle and the target vehicle to obtain a couple of tens of matched corresponding points. Although only five correct corresponding points are required to determine relative pose, a few tens of corresponding points are required in order to filter outliers when Random Sample Consensus (RANSAC) is utilized. RANSAC is an iterative method to estimate parameters of a mathematical model from a set of observed data which may contain one or more outliers.

Identifying corresponding keypoints requires a high computational overhead due to the fact that there is no prior knowledge of the nature of the keypoints that are being shared by the ego and target vehicles. All that is known to the vehicles is that the keypoints represent some salient features in the images that they gather (e.g., corner points). The lack of prior information on the shared keypoints may lead to incorrect keypoint matching. That is, when the target vehicle compares its keypoint descriptors with the keypoint descriptors received from the ego vehicle to determine the one or more corresponding keypoints, the target vehicle assumes that the shared features received from the ego vehicle could represent any of its determined keypoints. However, incorrect determination of corresponding points leads to incorrect relative pose estimation.

Although outliers can be removed using RANSAC filtering, incorrect keypoint matches due to lack of prior information about keypoints leads to a higher probability of outliers. The higher probability of outliers makes RANSAC filtering ineffective. That is, a greater number of keypoints need to be shared, with an increasing probability of outliers to enhance the likelihood of determining a correct pose solution. Further, this factor exponentially increases the computational complexity of RANSAC computations.

In some examples described herein, the ego vehicle and the target vehicle share semantic keypoint descriptors to enhance the likelihood of a correct match. Computational overhead may be reduced by minimizing the number/quantity of keypoints and keypoint descriptors shared between the ego vehicle and the target vehicle. In a further example described herein, semantic keypoint sharing may be performed to enhance a correctness of inferred matches for pose estimation. Pose estimation is an important component of autonomous driving (AD), autonomous driving assistance systems (ADAS), or other systems used to partially or fully autonomously control a vehicle. Pose estimation for such techniques may be used for autonomous driving, assistive robotics, augmented reality/virtual reality scene composition, image editing, or other such techniques. In another example described herein, semantic keypoint sharing may be performed to enhance a correctness of any use case where feature tracking and/or feature sharing is performed.

FIG. 1 is a block diagram illustrating an example system wherein an ego vehicle 100 shares semantic aspects of keypoints with a target vehicle 180, according to techniques of this disclosure. In this example, ego vehicle 100 includes camera 110, odometry unit 112, autonomous driving controller 120, and communications unit 121. Camera 110 is operatively coupled to odometry unit 112. Camera 110 is a single camera in this example. While only a single camera is shown in the example of FIG. 1, in other examples, multiple cameras may be used. However, the techniques of this disclosure allow for depth to be calculated for objects in images captured by camera 110 without additional cameras. In some examples, multiple cameras may be employed that face different directions, e.g., front, back, and to each side of ego vehicle 100. Autonomous driving controller 120 may be configured to calculate depth for objects captured by each of such cameras.

Odometry unit 112 collects visual odometry data from camera 110 for ego vehicle 100 by tracking keypoints, and feeds the collected visual odometry data to autonomous driving controller 120. In some examples, odometry unit 112 may also include a standard vehicular odometer that measures mileage traveled. In some examples, odometry unit 112 may be a fixed component of ego vehicle 100. In some examples, odometry unit 112 may represent an interface to a smartphone or other external device that can provide location information representing odometry data to autonomous driving controller 120. Ego vehicle 100 includes a communications unit 121 for communicating with a target vehicle 180 over a Cloud-to-Cloud Server (C2C) 510 via one or more over-the-air, radio-frequency (RF) interfaces. Communications unit 121 is communicatively coupled to autonomous driving controller 120.

Odometry unit 112 may perform techniques of this disclosure to determine semantic descriptions for keypoints of objects represented in images received via camera 110 using the images themselves. Odometry unit 112 may be configured to associate a first set of image data with a first set of keypoints, and to associate each keypoint in the first set of keypoints with a corresponding semantic keypoint descriptor to provide a first set of semantic keypoint descriptors. In a further example, a second autonomous driving unit, operatively coupled to a second camera, may associate a second set of image data with a second set of keypoints, and associate each keypoint in the second set of keypoints with a corresponding semantic keypoint descriptor to provide a second set of semantic keypoint descriptors. The second set of semantic keypoint descriptors may be received by the first autonomous driving unit over C2C 510 (FIG. 1). The first autonomous driving unit may compare the first set of semantic keypoint descriptors against the second set of semantic keypoint descriptors to identify one or more keypoints of the first set of keypoints that correspond to one or more keypoints of the second set of keypoints.

Target vehicle 180 includes an autonomous driving controller 184 according to techniques of this disclosure. In this example, target vehicle 180 includes camera 186, odometry unit 182, autonomous driving controller 184, and communications unit 185. Camera 186 is operatively coupled to odometry unit 182. Camera 186 is a single camera in this example. While only a single camera is shown in the example of FIG. 1, in other examples, multiple cameras may be used. However, the techniques of this disclosure allow for depth to be calculated for objects in images captured by camera 186 without additional cameras. In some examples, multiple cameras may be employed that face different directions, e.g., front, back, and to each side of target vehicle 180. Autonomous driving controller 184 may be configured to calculate depth for objects captured by each of such cameras.

Odometry unit 182 collects visual odometry data from camera 186 for target vehicle 180 by tracking keypoints, and feeds the collected visual odometry data to autonomous driving controller 184. In some examples, odometry unit 182 may also include a standard vehicular odometer that measures mileage traveled. In some examples, odometry unit 182 may be a fixed component of target vehicle 180. In some examples, odometry unit 182 may represent an interface to a smartphone or other external device that can provide location information representing odometry data to autonomous driving controller 184. Target vehicle 180 includes a communications unit 123, operatively coupled to odometry unit 182, for communicating with ego vehicle 100 over a Cloud-to-Cloud Server (C2C) 510 via one or more over-the-air, radio-frequency (RF) interfaces.

According to the techniques of this disclosure, autonomous driving controller 120 receives frames captured by camera 110 at a high frame rate, such as 30 fps, 60 fps, 90 fps, 120 fps, or even higher. Odometry unit 112 calculates visual odometry data from these image frames. Likewise, autonomous driving controller 184 receives frames captured by camera 186 at the high frame rate, such as 30 fps, 60 fps, 90 fps 120 fps, or even higher. Odometry unit 182 calculates visual odometry data from the image frames captured by camera 186. Per the techniques of this disclosure, autonomous driving controllers 120 and 184 may each calculate differences between the odometry data for two consecutive frames, and determine depth for objects in the most recent frame of the two frames using the two frames themselves, as well as the differences between the odometry data for the two frames. For example, autonomous driving controllers 120 and 184 may each construct a pose frame, which may be structured in the same manner as an image frame having a number of samples, and each sample may have a value corresponding to the differences between the odometry data for the two consecutive frames. Visual odometry data can be calculated using differences between positions of keypoints of one or more detected objects in the images, which can be tracked from image to image over time.

In general, the differences between the odometry data may represent either or both of translational differences and/or rotational differences along various axis in three-dimensional space. Thus, for example, assuming that the X-axis is side-to-side of ego vehicle 100 or target vehicle 180, the Y-axis is up and down of ego vehicle 100 or target vehicle 180, and the Z-axis is front to back of ego vehicle 100 or target vehicle 180, translational differences along the X-axis may represent side to side movement of ego vehicle 100 or target vehicle 180, translational differences along the Y-axis may represent upward or downward movement of ego vehicle 100 or target vehicle 180, and translational differences along the Z-axis may represent forward or backward movement of ego vehicle 100 or target vehicle 180. Under the same assumptions, rotational differences about the X-axis may represent pitch changes of ego vehicle 100 or target vehicle 180, rotational differences about the Y-axis may represent yaw changes of ego vehicle 100 or target vehicle 180, and rotational differences about the Z-axis may represent roll changes of ego vehicle 100 or target vehicle 180. When ego vehicle 100 or target vehicle 180 is an automobile or other ground-based vehicle, translational differences along the Z-axis may provide the most amount of information, with rotational differences about the Y-axis may provide additional useful information (e.g., in response to turning left or right, or remaining straight).

As such, in some examples, autonomous driving controller 120 and autonomous driving controller 184 may each construct a pose vector representing translational differences along each of the X-, Y-, and Z-axes between two consecutive image frames ([dX, dY, dZ]). Additionally or alternatively, autonomous driving controller 120 and autonomous driving controller 184 may each construct the pose vector to include translational differences along the X- and Z-axes and rotational differences about the Y-axis ([dX, rY, dZ]). Autonomous driving controller 120 and autonomous driving controller 184 may each form the pose frame to include three components, similar to RGB components or YUV/YCbCr components of an image frame. However, the pose frame may include X-, Y-, and Z-components, such that each sample of the pose frame includes the pose vector.

For example, the X-component of the pose frame may include samples each having the value of dX of the pose vector, the Y-component of the pose frame may include samples each having the value of dY or rY of the pose vector, and the Z-component of the pose frame may include samples each having the value of dZ. More or fewer components may be used. For example, the pose frame may include only a single Z-component, the Z-component and a Y-component, each of the X-, Y-, and Z-components, or one or two components per axis (e.g., either or both of the translational and/or rotational differences), or any combination thereof for any permutation of the axes.

Additionally or alternatively, these techniques may be employed in advanced driving assistance systems (ADAS). Rather than autonomously controlling ego vehicle 100 or target vehicle 180, such ADASs may provide feedback to a human operator of ego vehicle 100 or target vehicle 180, such as a warning to brake or turn if an object is too close. Additionally or alternatively, the techniques of this disclosure may be used to partially control ego vehicle 100 or target vehicle 180, e.g., to maintain speed of ego vehicle 100 when no objects within a threshold distance are detected ahead of ego vehicle 100, or if a separate vehicle is detected ahead of ego vehicle 100, to match the speed of the separate vehicle if the separate vehicle is within the threshold distance, to prevent reducing the distance between ego vehicle 100 and the separate vehicle.

Figure 2:
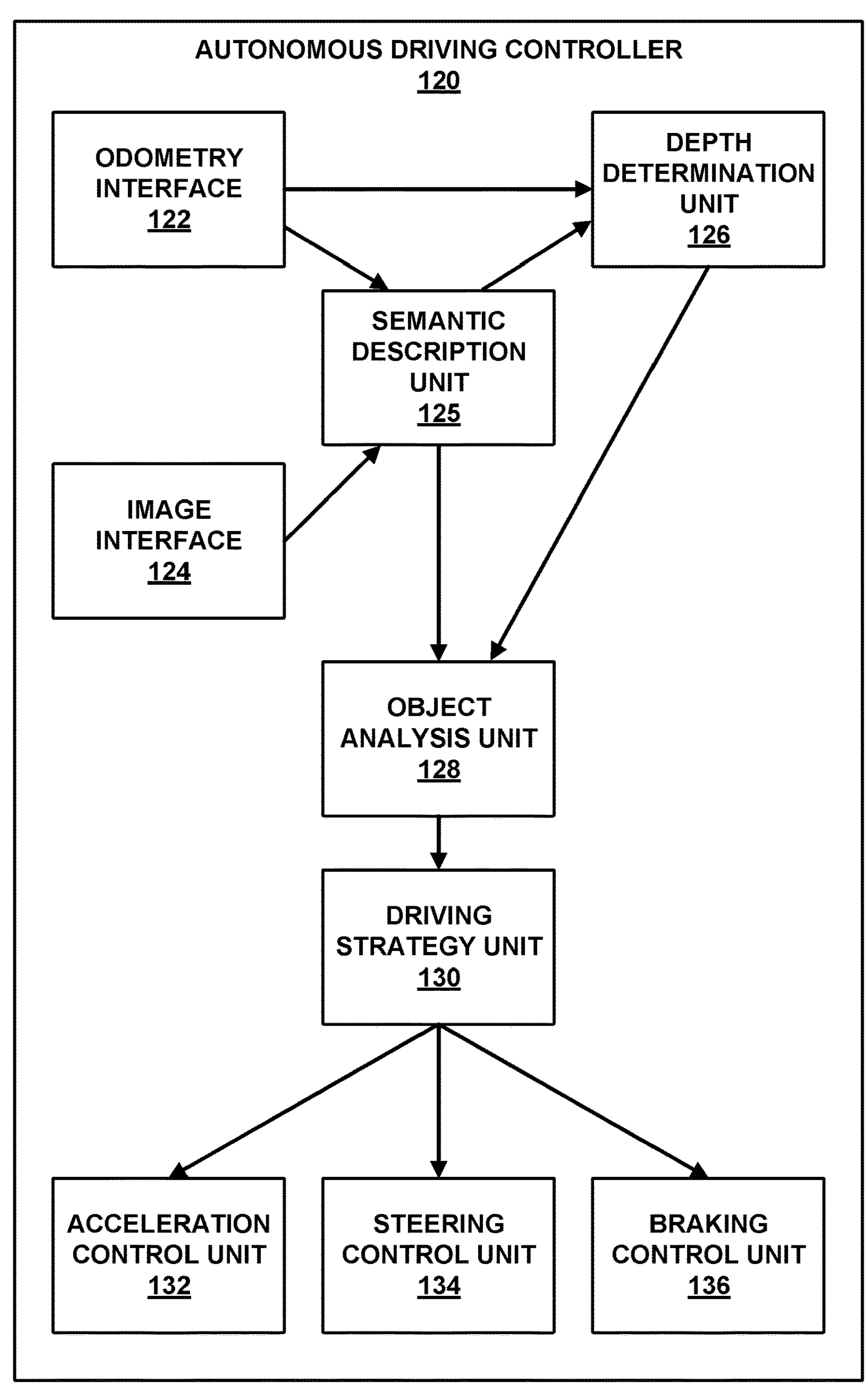
FIG. 2 is a block diagram illustrating an example set of components of an autonomous driving controller for at least one of the ego vehicle or the target vehicle, according to techniques of this disclosure.

FIG. 2 is a block diagram illustrating an example set of components of autonomous driving controller 120 of FIG. 1 according to techniques of this disclosure. A similar set of components can be used to implement autonomous driving controller 184 of FIG. 1. In the example of FIG. 2, autonomous driving controller 120 includes odometry interface 122, image interface 124, semantic description unit 125, depth determination unit 126, object analysis unit 128, driving strategy unit 130, acceleration control unit 132, steering control unit 134, and braking control unit 136.

In general, odometry interface 122 represents an interface to odometry unit 112 of FIG. 1, which receives odometry data from odometry unit 112 and provides the odometry data to semantic description unit 125. Similarly, image interface 124 represents an interface to camera 110 of FIG. 1 and provides images to semantic description unit 125.

Depth determination unit 126 may receive a pair of sequential images from camera 110 via image interface 124, as well as odometry data for ego vehicle 100 from odometry interface 122 at times when the images were captured. Depth description unit 126 may determine differences between the odometry data and construct a pose frame that is the same size as the image frames (e.g., including a number of samples that is the same as the number of samples in the image frames). Depth determination unit 126 may provide both of the image frames and the pose frame to a depth determination network thereof to cause the depth determination network to calculate depths of objects depicted in the images.

Image interface 124 may also provide the image frames to object analysis unit 128. Likewise, depth determination unit 126 may provide depth values for objects in the images to object analysis unit 128. Object analysis unit 128 may generally determine where objects are relative to the position of ego vehicle 100 at a given time, and may also determine whether the objects are stationary or moving. Object analysis unit 128 may provide object data to driving strategy unit 130, which may determine a driving strategy based on the object data. For example, driving strategy unit 130 may determine whether to accelerate, brake, and/or turn vehicle 100. Driving strategy unit 130 may execute the determined strategy by delivering vehicle control signals to various driving systems (acceleration, braking, and/or steering) via acceleration control unit 132, steering control unit 134, and braking control unit 136.

The various components of autonomous driving controller 120 may be implemented as any of a variety of suitable circuitry components, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure.

FIG. 3 is a table showing example shared coordinates, descriptors, and semantic meanings for a plurality of keypoints, according to the techniques of this disclosure. In some examples, ego vehicle 100 (FIG. 1) shares one or more semantic aspects of shared keypoints 301 (FIG. 3), such as a first keypoint $[x_1, y_1]$, a set of second keypoints $[x_{21}, y_{21}], \ldots [x_{26}, y_{26}]$, and a third keypoint $[x_3, y_3]$, with target vehicle 180 (FIG. 1). First keypoint $[x_1, y_1]$ (FIG. 3) is associated with a descriptor 303 comprising a class/type of object to which keypoint $[x_1, y_1]$ belongs. For purposes of illustration, the class/type of object may comprise "SURF/ORB/SIFT". First keypoint $[x_1, y_1]$ is also associated with a semantic meaning 305 comprising further details of descriptor 303 such as "left taillight of a car." Likewise, second set of keypoints $[x_{21}, y_{21}], \ldots [x_{26}, y_{26}]$ is associated with descriptor 303 including class/type of object "HARRIS/ORB/SIFT", and semantic meaning 305 such as "corner points of a STOP sign." Similarly, third keypoint $[x_3, y_3]$ is associated with descriptor 303 which, for purposes of illustration, is "HARRIS/ORB/SIFT", and semantic meaning 305 which, for purposes of illustration is "window pane corners of a building." In the example of FIG. 3, ego vehicle 100 (FIG. 1) shares keypoints and descriptors of a left taillight of a third vehicle, a stop sign, and corner points of a building with target vehicle 180.

FIG. 4 is a table showing illustrative preconfigured relationships between a semantic identifier 304 and a semantic meaning 585, according to the techniques of this disclosure. In some examples, C2C 510 (FIG. 1) and/or target vehicle 180 configure one or more vehicles for transmitting semantic information, and ego vehicle 100 transmits features with the configured semantics. In a further example, semantic identifiers are preconfigured, such that a value of 0 for semantic identifier 304 (FIG. 4) is associated with semantic meaning 585 comprising left tail car lights and/or truck lights in front of ego vehicle 100 (FIG. 1). Likewise, a value of 1 for semantic identifier 304 (FIG. 4) is associated with semantic meaning 585 comprising left tail car lights and/or truck lights on a side of ego vehicle 100 (FIG. 1). Similarly, a value of 2 for semantic identifier 304 (FIG. 4) is associated with semantic meaning 585 comprising corner points of a STOP sign. Additionally, a value of 3 for semantic identifier 304 is associated with semantic meaning 585 comprising corner points of foliage. In a further example, ego vehicle 100 only transmits keypoint 301 and associated descriptor 303 (FIG. 3) associated with the configured semantic identifier shown in FIG. 4.

Figure 5:
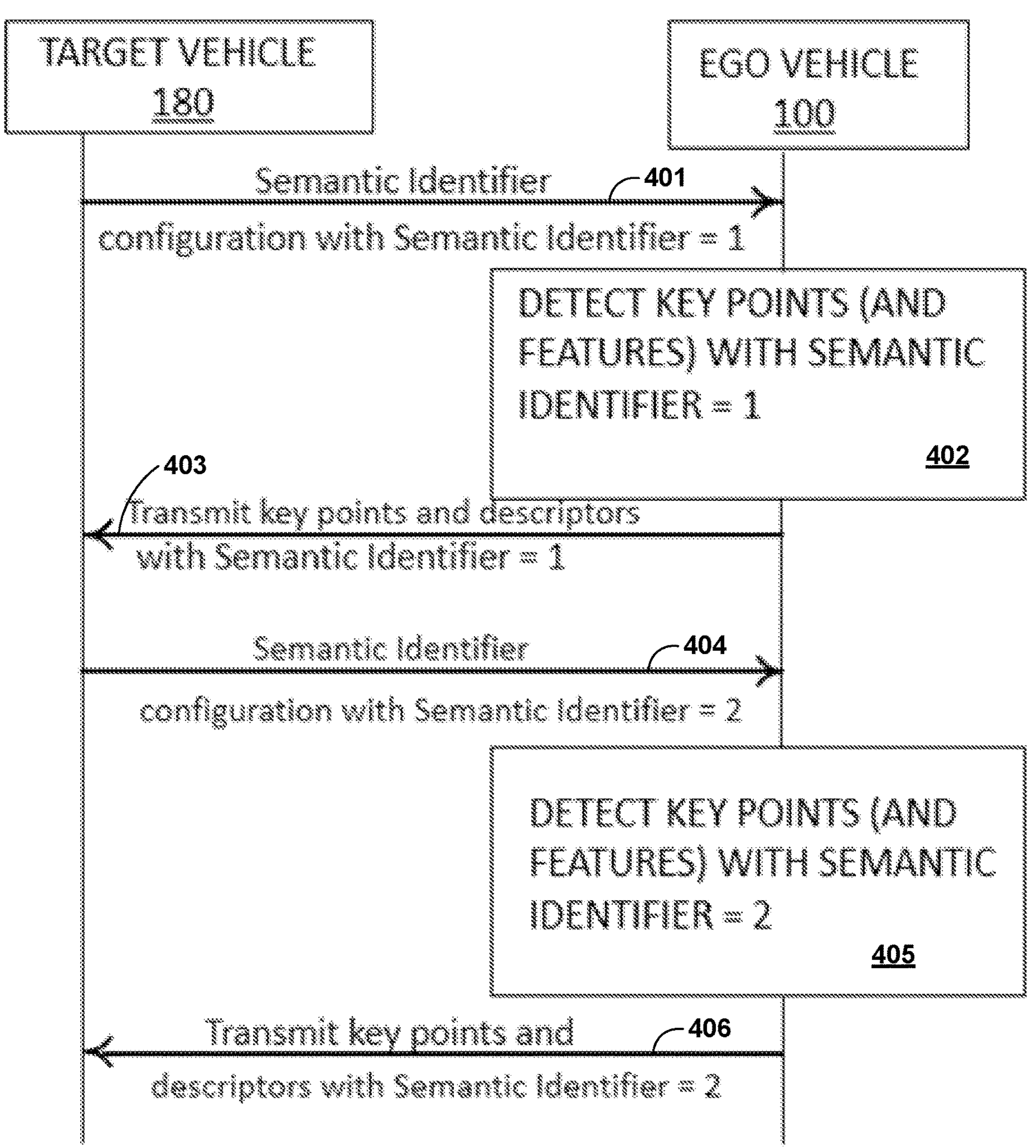
FIG. 5 is a flowchart illustrating an example method for detecting keypoints using semantic identifiers, according to the techniques of this disclosure.

FIG. 5 is a flowchart illustrating an example method for detecting keypoints using the preconfigured semantic identifiers of FIG. 4, according to the techniques of this disclosure. At block 401 (FIG. 5), target vehicle 180 (FIGS. 1 and 5) or C2C 510 (FIG. 1) transmits a semantic identifier configuration with a semantic identifier 304 (FIG. 4) of 1. At block 402 (FIG. 5), ego vehicle 100 (FIGS. 1 and 5) detects keypoints (and features) using the semantic identifier of 1. At block 403 (FIG. 5), the detected keypoints (and features) corresponding to the semantic identifier of 1 are sent from ego vehicle 100 to target vehicle 180. At block 404 (FIG. 5), target vehicle 180 (FIGS. 1 and 5) transmits a semantic identifier configuration with a semantic identifier 304 (FIG. 4) of 2. At block 405 (FIG. 5), ego vehicle 100 (FIGS. 1 and 5) detects keypoints (and features) using the semantic identifier of 2. At block 406 (FIG. 5), the detected keypoints (and features) corresponding to the semantic identifier of 2 are sent from ego vehicle 100 to target vehicle 180.

FIG. 6 is a table showing a first illustrative hierarchical arrangement of semantic identifiers, according to the techniques of this disclosure. In some examples, the hierarchical arrangement is configured by C2C 510 (FIG. 1). A first level of hierarchy may be defined with respect to a detected object, and a second level of hierarchy may be defined with respect to features of the detected object. For example, a first-level hierarchy may be based upon classifying the detected object into one of a plurality of object categories such as trucks, cars, and buildings. A second-level hierarchy may represent corner points of the detected object. In the example of FIG. 6, a first-level hierarchy identifier 501 may comprise $H_1$-1 (representing cars), and $H_1$-2 (representing trucks), wherein the subscripts are used to denote hierarchical levels. A second-level hierarchy identifier 502 may comprise $H_2$-1 (left taillight), wherein the second-level hierarchy identifier is associated with a semantic feature 505 comprising cars with left taillights as keypoints. Another second-level hierarchy identifier 502 may comprise $H_2$-2 (side view mirror), wherein the second-level hierarchy identifier is associated with a semantic feature 505 comprising cars with side view mirrors as keypoints. Yet another second-level hierarchy identifier 502 may comprise $H_2$-1 (left taillight), wherein the second-level hierarchy identifier is associated with a semantic feature 505 comprising trucks with left taillights as keypoints. Still another second-level hierarchy identifier 502 may comprise $H_2$-2 (side view mirror), wherein the second-level hierarchy identifier is associated with a semantic feature 505 comprising trucks with side view mirrors as keypoints. For example, when C2C 510 (FIG. 1) configures ($H_1$-1, $H_2$ 2), ego vehicle 100 shares with target vehicle 180 keypoints associated with side view mirror corner points of cars that ego vehicle 100 has in its field of view.

FIG. 7 is a table showing another example of a hierarchical arrangement of semantic identifiers, according to the techniques of this disclosure. In some examples, the hierarchical arrangement is configured by C2C 510 (FIG. 1). A first level of hierarchy may be defined with respect to a detected object, and a second level of hierarchy may be defined with respect to a finer identity of the detected object. For example, a first-level hierarchy may be based upon classifying the detected object into one of a plurality of object categories such as trucks, cars, and buildings. A second-level hierarchy may represent a feature of the detected object such as a color, a shape, or a license plate number. In the example of FIG. 7, the first-level hierarchy identifier 501 may comprise $H_1$-1 (representing cars). The second-level hierarchy identifier 502 may comprise $H_2$-1 (a car with license plate number X). A third-level hierarchy identifier 503 may comprise $H_3$-1 (representing a left taillight). These respective first, second and third hierarchy identifiers 501, 502 and 503 are associated with a corresponding semantic feature 505 comprising a car with license plate number X, with the left taillight as one or more keypoints. Another second-level hierarchy identifier 502 may comprise $H_2$ 2 (representing cars that are green in color), and another third-level hierarchy identifier 503 may comprise $H_3$ 2 (representing a side view mirror). These respective first, second, and third hierarchy identifiers 501, 502 and 503 are associated with a corresponding semantic feature comprising cars that are green in color with side view mirror corners as keypoints. For example, when C2C 510 (FIG. 1) configures ($H_1$-1, $H_2$ 2, $H_3$ 1), ego vehicle 100 shares with target vehicle 180 keypoints associated with left taillight corner points of cars that are green in color and that ego vehicle 100 has in its field of view.

Figure 8:
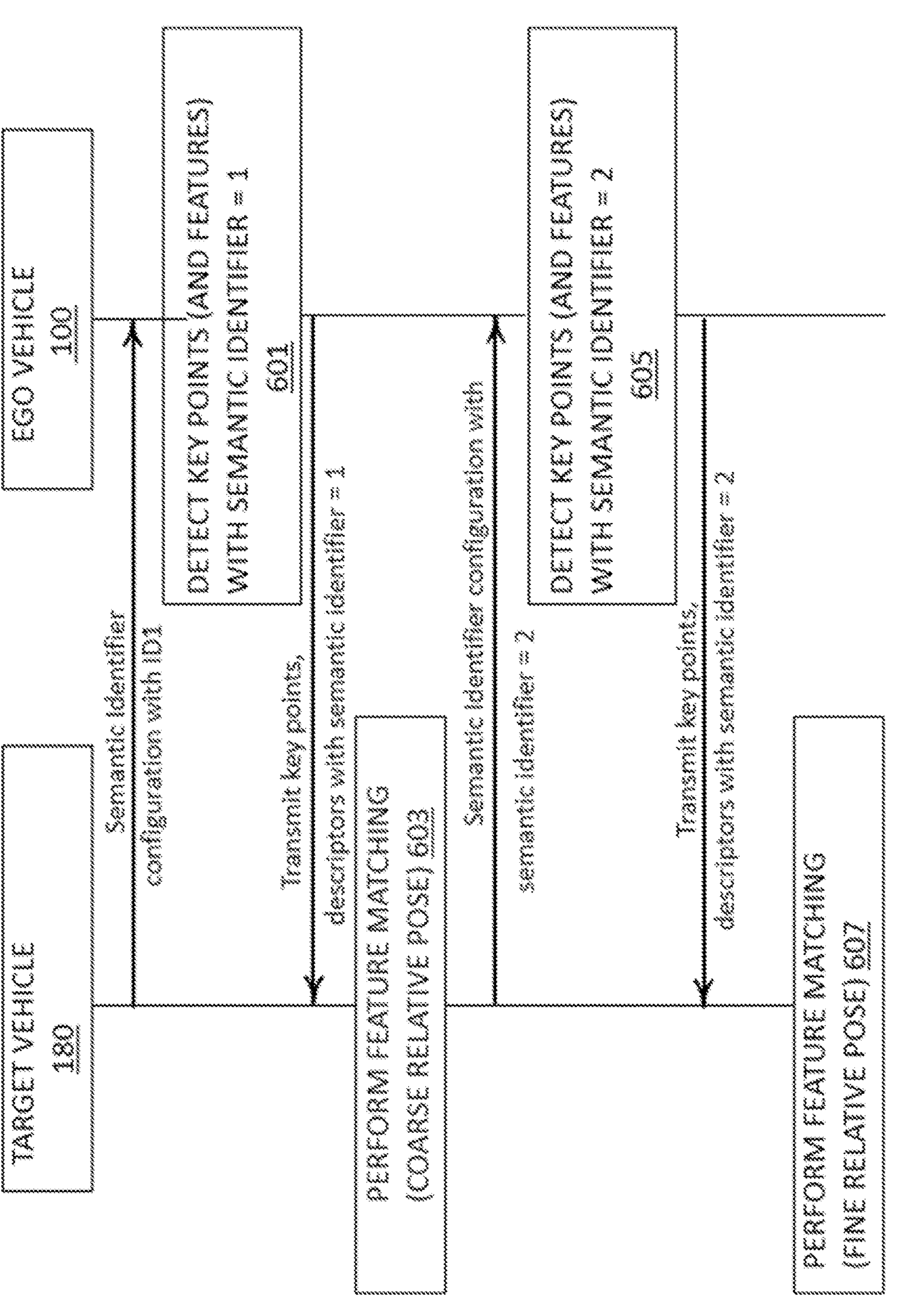
FIG. 8 is a flowchart illustrating an example method for detecting keypoints and performing feature matching, according to the techniques of this disclosure.

FIG. 8 is a flowchart illustrating an example method for detecting keypoints and performing feature matching, according to the techniques of this disclosure. Target vehicle 180 (or C2C 510 of FIG. 1) transmits a semantic identifier configuration with a semantic identifier of 1 to ego vehicle 100. At block 601 (FIG. 8), ego vehicle 100 detects keypoints (and features) associated with the semantic identifier of 1. Ego vehicle 100 transmits keypoints and descriptors associated with the semantic identifier of 1 to target vehicle 180 (or C2C 510 of FIG. 1). At block 603 (FIG. 8), target vehicle 180 (or C2C 510 of FIG. 1) performs feature matching for coarse relative pose, to match keypoints associated with the semantic identifier of 1 and received from ego vehicle 100, with what target vehicle 180 observes in its field of view.

In one example, with coarse matching, when a quantity of matches is sufficient to determine a relative pose, the coarse matching may be used as a final solution, or as an initial solution subject to further refinement. When the quantity of matches is not sufficient to determine the relative pose, target vehicle 180 (or C2C 510 of FIG. 1) transmits a semantic identifier configuration with a semantic identifier of 2 to ego vehicle 100. At block 605 (FIG. 8), ego vehicle 100 detects keypoints (and features) associated with the semantic identifier of 2. Ego vehicle 100 transmits keypoints and descriptors associated with the semantic identifier of 2 to target vehicle 180 (or C2C 510 of FIG. 1). At block 607 (FIG. 8), target vehicle 180 (or C2C 510 of FIG. 1) performs feature matching for fine relative pose, to match keypoints associated with the semantic identifier of 2 and received from ego vehicle 100, with what target vehicle 180 observes in its field of view. In some examples, the foregoing procedure can be repeated for one or more additional semantic identifiers until a final solution is provided to a specified accuracy.

Figure 9:
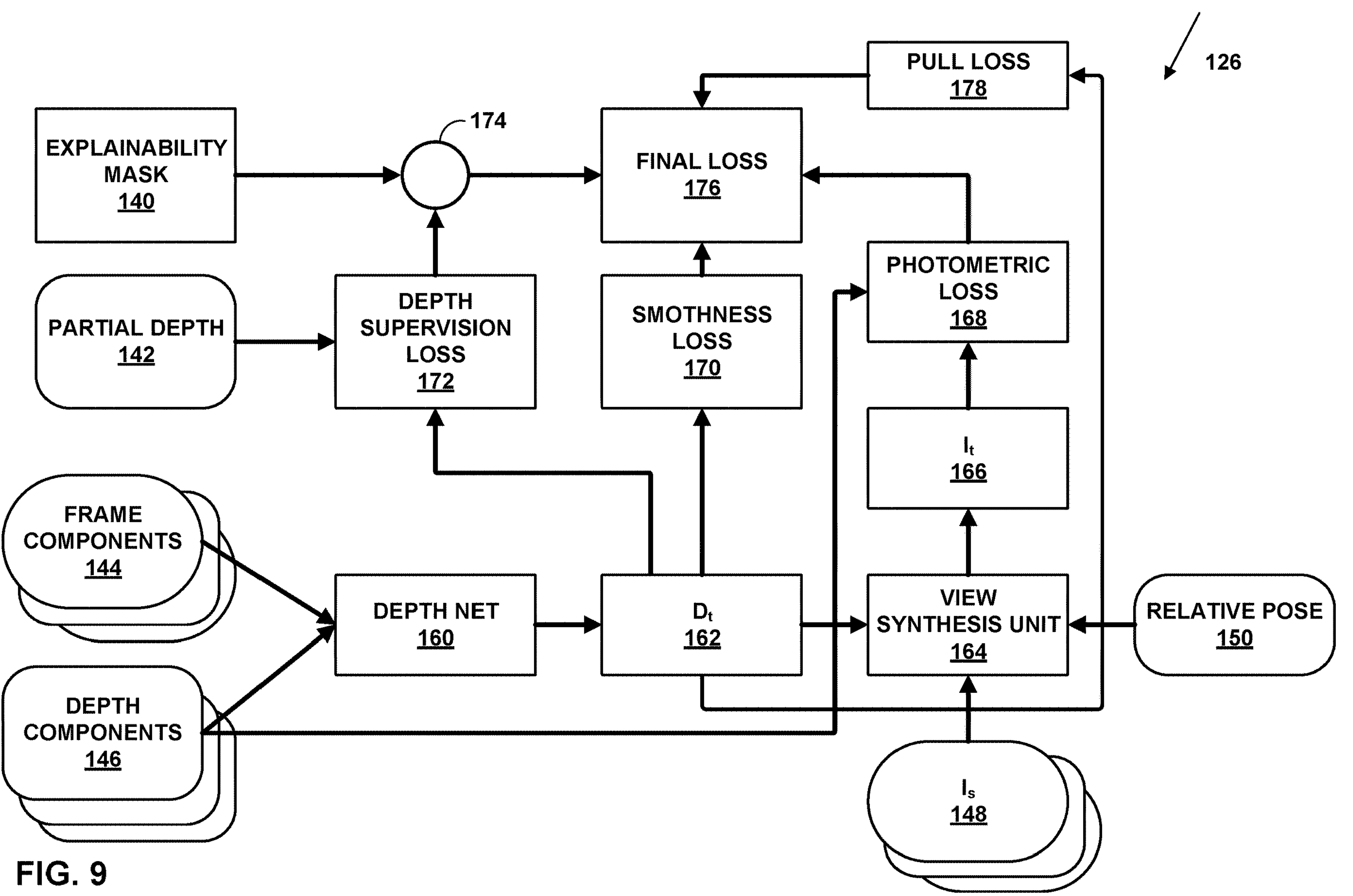
FIG. 9 is a block diagram illustrating an example set of components of a depth determination unit.

FIG. 9 is a block diagram illustrating an example set of components of depth determination unit 126 of FIG. 2. Depth determination unit 126 includes depth net 160, Dr 162, view synthesis unit 164, IT 166, photometric loss 168, smoothness loss 170, depth supervision loss 172, combination unit 174, final loss 176, and pull loss 178. As shown in the example of FIG. 3, depth determination unit 126 receives explainability mask 140, partial depth 142, frame components 144, depth components 146, Is 148, and relative pose data 150.

Frame components 144 correspond to components (e.g., R, G, and B components or Y, U, and V/Y, Cb, and Cr components) of image frames, e.g., received from camera 110 of FIG. 1. Depth components 146 correspond to components (e.g., X, Y, and/or Z components) corresponding to differences along or about X-, Y-, and/or Z-axes between odometry data for times at which the image frames were captured. Depth net 160 represents a depth learning AI/ML unit, such as a neural network, trained to determine depth values for objects included in the image frames using the odometry data.

DT 162 represents a depth map at time T (corresponding to the time at which the later image was captured) as calculated by depth net 160.

View synthesis unit 164 may synthesize one or more additional views using original image frames (Is 148) and the depth map, i.e., DT 162, as well as relative pose data 150. That is, using the depth map and relative pose data 150, view synthesis unit 164 may warp samples of the original image frames to produce one or more warped image frames, such that the samples of the original image frames are moved horizontally according to the determined depth values for the object to which the samples correspond. Relative pose data 150 may be measured or estimated by a pose network. IT 166 represents the resulting warped image generated by view synthesis unit 164.

Photometric loss unit 168 may calculate photometric loss, representing photometric differences between pixels warped from the received image frames and the pixels in the warped image, i.e., IT 166. Photometric loss unit 168 may provide the photometric loss to final loss unit 176.

Smoothness loss unit 170 may calculate smoothness loss of the depth map, i.e., DT 162. Smoothness loss generally represents a degree to which depth values are smooth, e.g., represent geometrically natural depth. Smoothness loss unit 170 may provide the smoothness loss to final loss unit 176.

Depth supervision loss unit 172 may calculate depth supervision loss of the depth map, i.e., DT 162, using partial depth data 142.

Explainability mask 140 generally represents confidence values, i.e., values indicating how confident depth net 160 is for various regions/samples of calculated depth maps, such as DT 162. Thus, combination unit 174 may apply explainability mask 140 to the depth supervision loss calculated by depth supervision loss unit 172 and provide this masked input to final loss unit 176.

Pull loss unit 178 may calculate pull loss, representing a degree to which corners of an object are accurately joined in the depth map, i.e., DT 162. Pull loss unit 178 may receive data representing input shapes to calculate the pull loss. Pull loss unit 178 may provide the pull loss to final loss unit 176.

Ultimately, final loss unit 176 may calculate final loss, representing overall accuracy of the depth map, DT 162.

Figure 10:
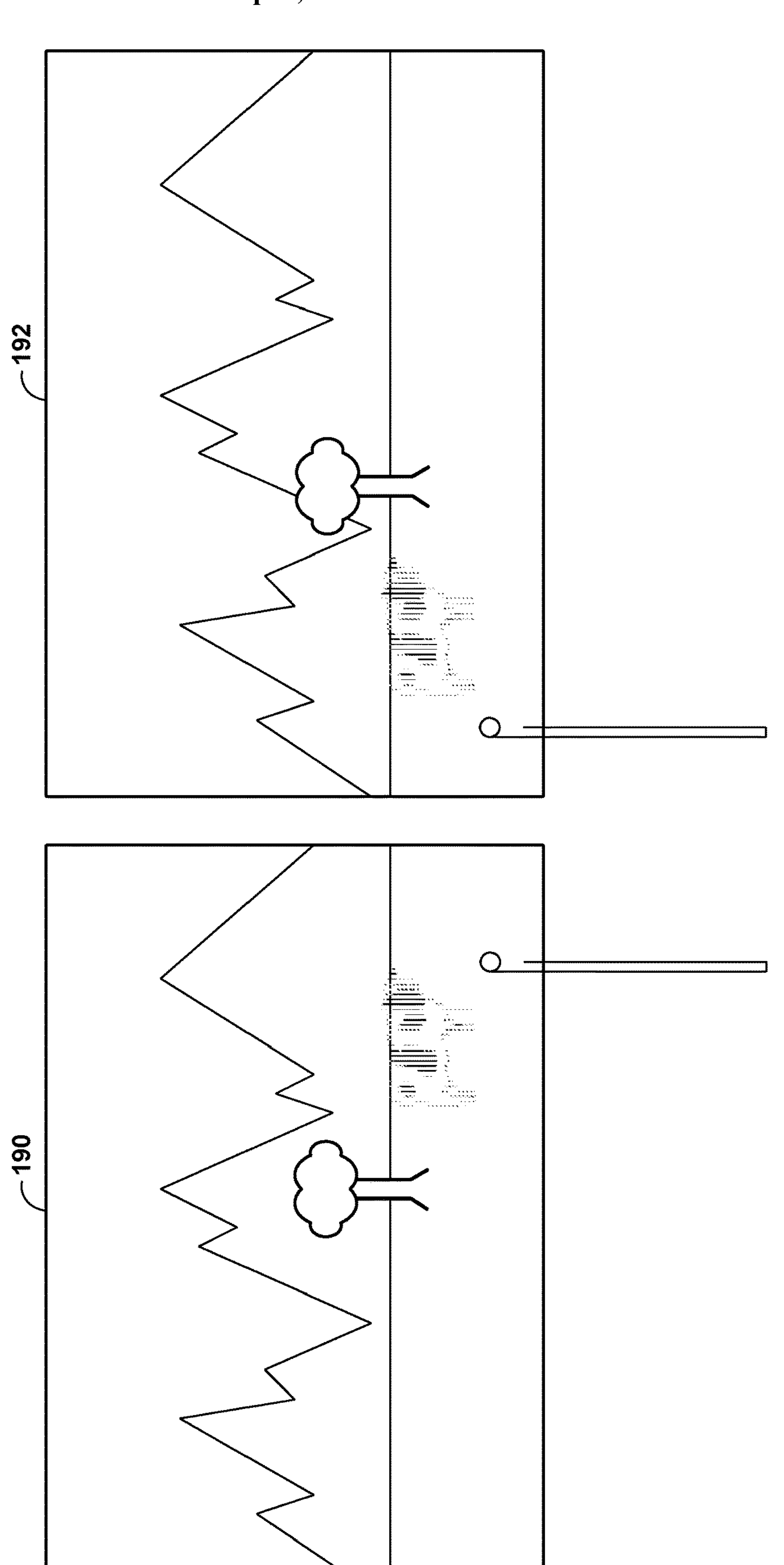
FIG. 10 is a conceptual diagram illustrating example images captured at different times to demonstrate motion parallax.

FIG. 10 is a conceptual diagram illustrating example images 190, 192 captured at different times to demonstrate motion parallax. Motion parallax is generally the concept that objects moving at a constant speed across a frame of image data will appear to move a greater amount if they are closer to the camera than objects at further distances.

In the example of FIG. 10, it is assumed that image 190 is captured by a camera at a first time, and that image 192 is captured by the camera at a second, later time. The camera is assumed to be mounted in a vehicle that is traveling parallel with the mountains in the distance of images 190, 192. Thus, as can be seen in the example of FIG. 10, objects closer to the camera, such as the flower and cow, appear to move more than objects further from the camera, such as the tree, and the mountains in the far distance appear not to move at all between images 190 and 192.

By taking advantage of odometry information, a neural network may take advantage of motion parallax. Research into the techniques of this disclosure demonstrated that lacking such odometry information results in suboptimal estimation of a depth map, especially in scenarios in which a vehicle pose is drastically/unpredictably changing between captured frames.

Figure 11:
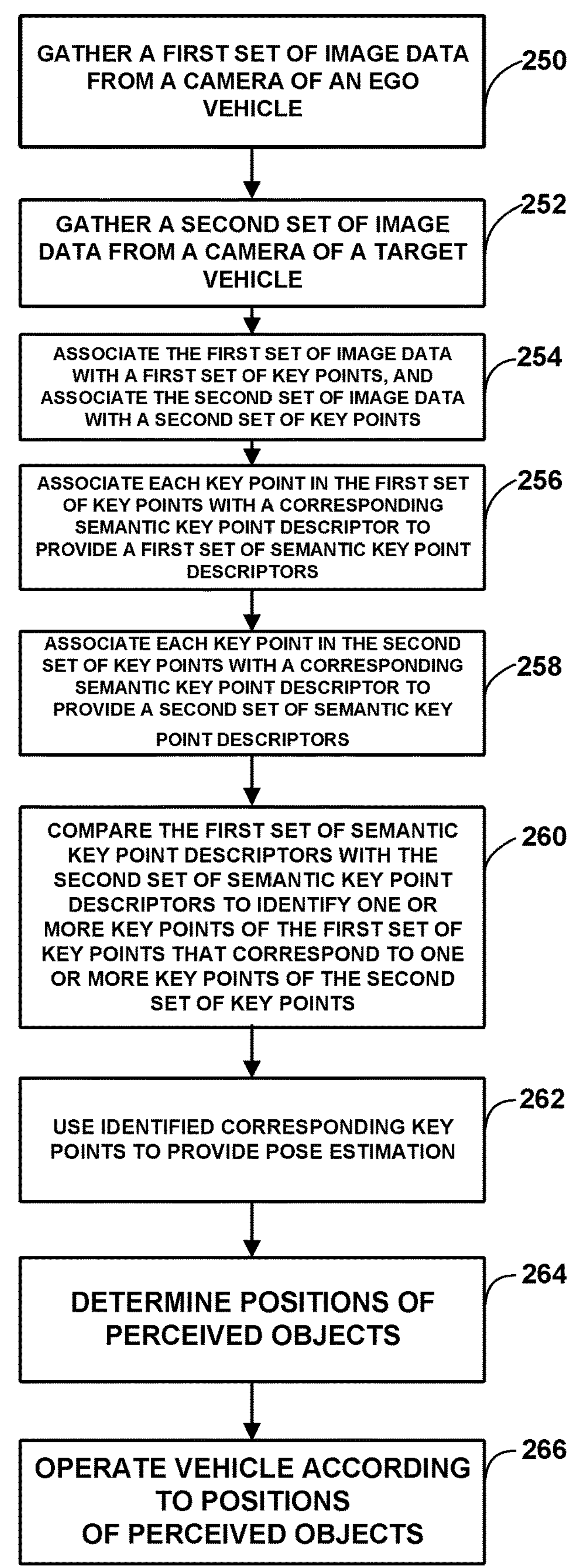
FIG. 11 is a flowchart illustrating an example method of performing image processing by sharing visual features with a target vehicle, according to techniques of this disclosure.

FIG. 11 is a flowchart illustrating an example method of performing image processing by sharing visual features with a target vehicle, according to techniques of this disclosure. At block 250, a first set of image data is gathered from a camera of ego vehicle 100 (FIG. 1). At block 252 (FIG. 11), a second set of image data is gathered from a camera of target vehicle 180 (FIG. 1). The first set of image data is associated with a first set of keypoints, and the second set of image data is associated with a second set of keypoints (FIG. 11, block 254). Each keypoint in the first set of keypoints is associated with a corresponding semantic keypoint descriptor to provide a first set of semantic keypoint descriptors (block 256). Each keypoint in the second set of keypoints is associated with a corresponding semantic keypoint descriptor to provide a second set of semantic keypoint descriptors (block 258). The first set of semantic keypoint descriptors is compared with the second set of semantic keypoint descriptors to identify one or more keypoints of the first set of keypoints that corresponds to one or more keypoints of the second set of keypoints (block 260). The identified corresponding keypoints are used to provide pose estimation (block 262). The pose estimation is used to determine positions of perceived objects (block 264). The target vehicle is operated according to the determined positions of the perceived objects (block 266).

Various examples of the techniques of this disclosure are summarized in the following clauses:

Clause 1—A method of processing image data, the method comprising: determining, by processing circuitry of an image analysis unit, a set of criteria representing keypoints of interest for processed image data; extracting, by the processing circuitry, a plurality of keypoints from the image; determining, by the processing circuitry, which of the plurality of keypoints match the set of criteria representing the keypoints of interest to determine a matching set of keypoints; and outputting, by the processing circuitry, data representative of the matching set of keypoints.

Clause 2—The method of Clause 1, wherein outputting the data representative of the matching set of keypoints comprises outputting, for each of the matching set of keypoints, a keypoint location and a descriptor for the keypoint at the keypoint location.

Clause 3—The method of Clause 1, wherein determining the set of criteria representing the keypoints of interest comprises: receiving one or more identifiers; and determining a mapping for each of the identifiers to one of the keypoints of interest.

Clause 4—The method of Clause 1, wherein determining the set of criteria representing the keypoints of interest comprises: receiving data representing a set of one or more objects of interest; and, for each of the objects in the set of one or more objects of interest, receiving data representing one or more keypoints of interest for the corresponding object.

Clause 5—The method of Clause 4, further comprising defining a first level of hierarchy with respect to the corresponding object, and defining a second level of hierarchy with respect to one or more features of the corresponding object.

Clause 6—The method of Clause 4, further comprising defining a first level of hierarchy with respect to the corresponding object, and defining a second level of hierarchy with respect to a finer identity of the corresponding object.

Clause 7—The method of Clause 4, further comprising associating each of the one or more keypoints of interest with a corresponding semantic configuration identifier specifying a corresponding feature category.

Clause 8—The method of Clause 4, further comprising performing a coarse matching procedure for matching the one or more keypoints of interest with the corresponding object, and subsequently performing a fine matching procedure for matching the one or more keypoints of interest with the corresponding object.

Clause 9—The method of Clause 4, wherein determining which of the keypoints match the set of criteria representing the keypoints of interest comprises: identifying objects in the image; for each of the identified objects, determining whether the object matches one of the set of one or more objects of interests to determine matching objects; and, for each of the matching objects, determining whether keypoints for the matching object match one of the one or more keypoints of interest to determine the matching set of keypoints.

Clause 10—The method of Clause 1, wherein determining the set of criteria representing the keypoints of interest comprises: receiving data representing a set of one or more objects of interest; and, for each of the objects in the set of objects of interest, receiving data representing attributes of interest for the corresponding object; and, for each of the objects in the set of objects having the representative attributes, receiving data representing one or more keypoints of interest for the corresponding object.

Clause 11—The method of Clause 10, wherein determining which of the keypoints match the set of criteria representing the keypoints of interest comprises: identifying objects in the image; for each of the identified objects, determining whether the object has the attributes of interest to determine matching objects; and, for each of the matching objects, determining whether keypoints for the matching object match one of the one or more keypoints of interest to determine the matching set of keypoints.

Clause 12—The method of Clause 1, wherein the image analysis unit is included in an ego vehicle, and wherein outputting the data representative of the matching set of keypoints comprises outputting the data representative of the matching set of keypoints to a target vehicle.

Clause 13—The method of Clause 1, wherein the image analysis unit is included in an ego vehicle, and wherein determining the set of criteria representing keypoints of interest comprises receiving the set of criteria representing the keypoints of interest from a target vehicle.

Clause 14—A device for processing image data, wherein the device includes processing circuitry configured to: determine a set of criteria representing keypoints of interest for processed image data; extract a plurality of keypoints from the image; determine which of the plurality of keypoints match the set of criteria representing the keypoints of interest to determine a matched set of keypoints; and output data representative of the matched set of keypoints.

Clause 15—The device of Clause 14, wherein output the data comprises output, for each of the matched set of keypoints, a keypoint location and a descriptor for the keypoint at the keypoint location.

Clause 16—The device of Clause 14, wherein determine the set of criteria representing the keypoints of interest comprises: receive one or more identifiers; and determine a mapping for each of the identifiers to one of the keypoints of interest.

Clause 17—The device of Clause 14, wherein determine the set of criteria representing the keypoints of interest comprises: receive data representing a set of one or more objects of interest; and, for each of the objects in the set of one or more objects of interest, receive data representing one or more keypoints of interest for the corresponding object.

Clause 18—The device of Clause 17, wherein the device includes processing circuitry configured to define a first level of hierarchy with respect to the corresponding object, and to define a second level of hierarchy with respect to one or more features of the corresponding object.

Clause 19—The device of Clause 17, wherein the device includes processing circuitry configured to define a first level of hierarchy with respect to the corresponding object, and to define a second level of hierarchy with respect to a finer identity of the corresponding object.

Clause 20—The device of Clause 17, wherein the device includes processing circuitry configured to associate each of the one or more keypoints of interest with a corresponding semantic configuration identifier specifying a corresponding feature category.

Clause 21—The device of Clause 17, wherein the device includes processing circuitry configured to perform a coarse matching procedure for matching the one or more keypoints of interest with the corresponding object, and to subsequently perform a fine matching procedure for matching the one or more keypoints of interest with the corresponding object.

Clause 22—A method of processing image data, the method comprising: determining, by processing circuitry of an image analysis unit, a set of criteria representing keypoints of interest for processed image data; extracting, by the processing circuitry, a plurality of keypoints from the image; determining, by the processing circuitry, which of the plurality of keypoints match the set of criteria representing the keypoints of interest to determine a matching set of keypoints; and outputting, by the processing circuitry, data representative of the matching set of keypoints.

Clause 23—The method of Clause 22, wherein outputting the data representative of the matching set of keypoints comprises outputting, for each of the matching set of keypoints, a keypoint location and a descriptor for the keypoint at the keypoint location.

Clause 24—The method of any of Clauses 22-23, wherein determining the set of criteria representing the keypoints of interest comprises: receiving one or more identifiers; and determining a mapping for each of the identifiers to one of the keypoints of interest.

Clause 25—The method of any of Clauses 22-24, wherein determining the set of criteria representing the keypoints of interest comprises: receiving data representing a set of one or more objects of interest; and, for each of the objects in the set of one or more objects of interest, receiving data representing one or more keypoints of interest for the corresponding object.

Clause 26—The method of Clause 25, further comprising defining a first level of hierarchy with respect to the corresponding object, and defining a second level of hierarchy with respect to one or more features of the corresponding object.

Clause 27—The method of any of Clauses 25-26, further comprising defining a first level of hierarchy with respect to the corresponding object, and defining a second level of hierarchy with respect to a finer identity of the corresponding object.

Clause 28—The method of any of Clauses 25-27, further comprising associating each of the one or more keypoints of interest with a corresponding semantic configuration identifier specifying a corresponding feature category.

Clause 29—The method of any of Clauses 25-28, further comprising performing a coarse matching procedure for matching the one or more keypoints of interest with the corresponding object, and subsequently performing a fine matching procedure for matching the one or more keypoints of interest with the corresponding object.

Clause 30—The method of any of Clauses 25-29, wherein determining which of the keypoints match the set of criteria representing the keypoints of interest comprises: identifying objects in the image; for each of the identified objects, determining whether the object matches one of the set of one or more objects of interests to determine matching objects; and, for each of the matching objects, determining whether keypoints for the matching object match one of the one or more keypoints of interest to determine the matching set of keypoints.

Clause 31—The method of any of Clauses 22-30, wherein determining the set of criteria representing the keypoints of interest comprises: receiving data representing a set of one or more objects of interest; and, for each of the objects in the set of objects of interest, receiving data representing attributes of interest for the corresponding object; and, for each of the objects in the set of objects having the representative attributes, receiving data representing one or more keypoints of interest for the corresponding object.

Clause 32—The method of Clause 31, wherein determining which of the keypoints match the set of criteria representing the keypoints of interest comprises: identifying objects in the image; for each of the identified objects, determining whether the object has the attributes of interest to determine matching objects; and, for each of the matching objects, determining whether keypoints for the matching object match one of the one or more keypoints of interest to determine the matching set of keypoints.

Clause 33—The method of any of Clauses 22-32, wherein the image analysis unit is included in an ego vehicle, and wherein outputting the data representative of the matching set of keypoints comprises outputting the data representative of the matching set of keypoints to a target vehicle.

Clause 34—The method of any of Clauses 22-33, wherein the image analysis unit is included in an ego vehicle, and wherein determining the set of criteria representing keypoints of interest comprises receiving the set of criteria representing the keypoints of interest from a target vehicle.

Clause 35—A device for processing image data, wherein the device includes processing circuitry configured to: determine a set of criteria representing keypoints of interest for processed image data; extract a plurality of keypoints from the image; determine which of the plurality of keypoints match the set of criteria representing the keypoints of interest to determine a matched set of keypoints; and output data representative of the matched set of keypoints.

Clause 36—The device of Clause 35, wherein output the data comprises output, for each of the matched set of keypoints, a keypoint location and a descriptor for the keypoint at the keypoint location.

Clause 37—The device of any of Clauses 35-36, wherein determine the set of criteria representing the keypoints of interest comprises: receive one or more identifiers; and determine a mapping for each of the identifiers to one of the keypoints of interest.

Clause 38—The device of any of Clauses 35-37, wherein determine the set of criteria representing the keypoints of interest comprises: receive data representing a set of one or more objects of interest; and, for each of the objects in the set of one or more objects of interest, receive data representing one or more keypoints of interest for the corresponding object.

Clause 39—The device of Clause 38, wherein the device includes processing circuitry configured to define a first level of hierarchy with respect to the corresponding object, and to define a second level of hierarchy with respect to one or more features of the corresponding object.

Clause 40—The device of any of Clauses 38-39, wherein the device includes processing circuitry configured to define a first level of hierarchy with respect to the corresponding object, and to define a second level of hierarchy with respect to a finer identity of the corresponding object.

Clause 41—The device of any of Clauses 38-40, wherein the device includes processing circuitry configured to associate each of the one or more keypoints of interest with a corresponding semantic configuration identifier specifying a corresponding feature category.

Clause 42—The device of any of Clauses 38-41, wherein the device includes processing circuitry configured to perform a coarse matching procedure for matching the one or more keypoints of interest with the corresponding object, and to subsequently perform a fine matching procedure for matching the one or more keypoints of interest with the corresponding object.

Clause 43—A computer-readable storage medium having stored thereon instructions that, when executed, cause a processor to: determine a set of criteria representing keypoints of interest for processed image data; extract a plurality of keypoints from the image; determine which of the plurality of keypoints match the set of criteria representing the keypoints of interest to determine a matched set of keypoints; and output data representative of the matched set of keypoints.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing image data, the method comprising:

receiving, by processing circuitry of an image analysis unit of a current vehicle, semantic identifier configuration data from a remote vehicle, the semantic identifier configuration data including a semantic identifier of at least a portion of an object near the current vehicle and the remote vehicle;

determining, by processing circuitry keypoints of interest for the at least portion of the object from the semantic identifier configuration data;

extracting, by the processing circuitry, a plurality of keypoints from an image captured by a camera of the current vehicle;

determining, by the processing circuitry, which of the plurality of keypoints match the keypoints of interest to determine a matching set of keypoints for the at least portion of the object;

calculating, by the processing circuitry, a pose of the current vehicle using the matching set of keypoints;

providing, by the processing circuitry, driving assistance to an operator of the current vehicle based on the pose of the current vehicle; and outputting, by the processing circuitry, data representative of the matching set of keypoints to the remote vehicle.

2. The method of claim 1, wherein outputting the data representative of the matching set of keypoints comprises outputting, for each of the matching set of keypoints, a keypoint location and a descriptor for the keypoint at the keypoint location.

3. The method of claim 1, wherein determining the keypoints of interest comprises:

receiving one or more identifiers; and determining a mapping for each of the identifiers to one of the keypoints of interest.

4. The method of claim 1, wherein determining the keypoints of interest comprises:

receiving data representing a set of one or more objects of interest; and for each of the objects in the set of one or more objects of interest, receiving data representing one or more keypoints of interest for the corresponding object.

5. The method of claim 4, further comprising defining a first level of hierarchy with respect to the corresponding object, and defining a second level of hierarchy with respect to one or more features of the corresponding object.

6. The method of claim 4, further comprising defining a first level of hierarchy with respect to the corresponding object, and defining a second level of hierarchy with respect to a finer identity of the corresponding object.

7. The method of claim 4, further comprising associating each of the one or more keypoints of interest with a corresponding semantic configuration identifier specifying a corresponding feature category.

8. The method of claim 4, further comprising performing a coarse matching procedure for matching the one or more keypoints of interest with the corresponding object, and subsequently performing a fine matching procedure for matching the one or more keypoints of interest with the corresponding object.

9. The method of claim 4, wherein determining which of the keypoints match the keypoints of interest comprises:

identifying objects in the image;

for each of the identified objects, determining whether the object matches one of the set of one or more objects of interests to determine matching objects; and for each of the matching objects, determining whether keypoints for the matching object match one of the one or more keypoints of interest to determine the matching set of keypoints.

10. The method of claim 1, wherein determining the keypoints of interest comprises:

receiving data representing a set of one or more objects of interest; and for each of the objects in the set of objects of interest, receiving data representing attributes of interest for the corresponding object; and for each of the objects in the set of objects having the representative attributes, receiving data representing one or more keypoints of interest for the corresponding object.

11. The method of claim 10, wherein determining which of the keypoints match the keypoints of interest comprises:

identifying objects in the image;

for each of the identified objects, determining whether the object has the attributes of interest to determine matching objects; and for each of the matching objects, determining whether keypoints for the matching object match one of the one or more keypoints of interest to determine the matching set of keypoints.

12. The method of claim 1, wherein receiving the semantic identifier configuration data comprises receiving the semantic identifier configuration data from the remote vehicle via a server device communicatively coupled to the current vehicle and to the remote vehicle.

13. The method of claim 1, wherein receiving the semantic identifier configuration data comprises receiving the semantic identifier configuration data directly from the remote vehicle.

14. A device for processing image data, the device being configured to provide driving assistance to a current vehicle, wherein the device includes processing circuitry configured to:

receive semantic identifier configuration data from a remote vehicle, the semantic identifier configuration data including a semantic identifier of at least a portion of an object near the current vehicle and the remote vehicle;

determine keypoints of interest for the at least portion of the object from the semantic identifier configuration data;

extract a plurality of keypoints from an image captured by a camera of the current vehicle;

determine which of the plurality of keypoints match the keypoints of interest to determine a matched set of keypoints for the at least portion of the object;

calculate a pose of the current vehicle using the matching set of keypoints;

provide driving assistance to an operator of the current vehicle based on the pose of the current vehicle; and output data representative of the matched set of keypoints to the remote vehicle.

15. The device of claim 14, wherein output the data comprises output, for each of the matched set of keypoints, a keypoint location and a descriptor for the keypoint at the keypoint location.

16. The device of claim 14, wherein to determine the keypoints of interest, the processing circuitry is configured to:

receive one or more identifiers; and determine a mapping for each of the identifiers to one of the keypoints of interest.

17. The device of claim 14, wherein to determine the keypoints of interest, the processing circuitry is configured to:

receive data representing a set of one or more objects of interest; and for each of the objects in the set of one or more objects of interest, receive data representing one or more keypoints of interest for the corresponding object.

18. The device of claim 17, wherein the processing circuitry is further configured to define a first level of hierarchy with respect to the corresponding object, and to define a second level of hierarchy with respect to one or more features of the corresponding object.

19. The device of claim 17, wherein the processing circuitry is further configured to define a first level of hierarchy with respect to the corresponding object, and to define a second level of hierarchy with respect to a finer identity of the corresponding object.

20. The device of claim 17, wherein the processing circuitry is further configured to associate each of the one or more keypoints of interest with a corresponding semantic configuration identifier specifying a corresponding feature category.

21. The device of claim 17, wherein the processing circuitry is further configured to perform a coarse matching procedure for matching the one or more keypoints of interest with the corresponding object, and to subsequently perform a fine matching procedure for matching the one or more keypoints of interest with the corresponding object.

22. A device for processing image data, the device being configured to provide driving assistance to a current vehicle, the device comprising:

means for receiving semantic identifier configuration data from a remote vehicle, the semantic identifier configuration data including a semantic identifier of at least a portion of an object near the current vehicle and the remote vehicle;

means for determining keypoints of interest for the at least portion of the object from the semantic identifier configuration data;

means for extracting a plurality of keypoints from an image captured by a camera of the current vehicle;

means for determining which of the plurality of keypoints match the keypoints of interest to determine a matching set of keypoints for the at least portion of the object;

means for calculating a pose of the current vehicle using the matching set of keypoints;

means for providing driving assistance to an operator of the current vehicle based on the pose of the current vehicle; and means for outputting data representative of the matching set of keypoints.

* * * * *